3,253,011
Patented May 24, 1966

3,253,011
CHLORINATED m-PHENYLENE DIISOCYANATE COMPOSITION AND METHOD FOR PREPARATION THEREOF

Sylvan E. Forman, Lawrence Township, N.J., assignor to FMC Corporation, New York, N.Y., a corporation of Delaware
No Drawing. Filed Mar. 5, 1963, Ser. No. 262,841
7 Claims. (Cl. 260—453)

This invention relates to chlorinated m-phenylene diisocyanate, and more particularly to a method of lowering the freezing range of chlorinated m-phenylene dicyanate compositions containing dichloro-m-phenylene diisocyanate. This invention also relates to a method of producing more complex higher chlorinated m-phenylene diisocyanate mixtures having lowered freezing ranges with full utilization of all products produced in the chlorination of m-phenylene diisocyanate.

Aromatic polyisocyanates have found considerable use in recent years as intermediates in the preparation of rigid and flexible foams, coatings and abrasion-resistant rubber substitutes. These products are prepared by reacting a high molecular weight polyol with an aromatic polyisocyanate, thereby forming a polyurethane composition. Since the polyurethane reaction is generally carried out at room temperature, it is desirable that the polyisocyanate be liquid at this temperature so that it can be thoroughly blended with the high molecular weight polyol before the reaction commences.

In recent years there has been much interest in the preparation of flame-retardant polyurethane compositions. It has been suggested, for example, that polyurethane compositions having improved flame resistance can be prepared from chlorinated aromatic polyisocyanates. However, this suggestion has achieved no commercial success, esentially due to the fact that chlorinated aromatic polyisocyanates are solids at room temperature. Accordingly, there is a real need for a highly chlorinated aromatic polyisocyanate which is liquid at room temperature.

In a co-pending application of C. A. Erickson and D. Warren, Serial No. 202,100, filed June 13, 1962, novel aromatic polyisocyanate blends which contain about 25–42% by weight of chlorine, and which are capable of existing as liquids at about 25° C. are described. These liquid blends contain about 25–40% tetrachloro-m-phenylene diisocyanate, about 25–40% trichloro-m-phenylene diisocyanate and about 20–50% aromatic polyisocyanate other than tetrachloro- and trichloro-m-phenylene diisocyanate. The preferred aromatic polyisocyanate blends are those in which the third component is dichloro-m-phenylene diisocyanate.

I have now discovered a method of lowering the freezing range of compositions containing dichloro-m-phenylene diisocyanate without significantly reducing their chlorine content which comprises partially crystallizing the composition by cooling, separating the liquid phase from the solid phase, and recovering the liquid phase having a lower freezing range than the original composition but a chlorine content substantially the same as that of the original composition.

When dichloro-m-phenylene diisocyanate is prepared by the chlorination of m-phenylene diisocyanate, chlorination takes place progressively, first forming monochloro-m-phenylene diisocyanate, then converting this monochlorinated product to dichloro-m-phenylene diisocyanate. However, before all of the monochloro- product has been converted to dichloro-, some of the dichloro- is converted to trichloro-. Accordingly, the chlorination reaction can be stopped at any desired point to give a product which is a mixture of monochloro-m-phenylene diisocyanate and dichloro-m-phenylene diisocyanate, a mixture of monochloro-m-phenylene diisocyanate, dichloro-m-phenylene and trichloro-m-phenylene diisocyanate, or a mixture of dichloro-m-phenylene and trichloro-m-phenylene diisocyanate. Since these chlorination products are known to contain two or more different compounds, it is not surprising that they freeze over a range, within which solid is in equilibrium with liquid, rather than having a sharp freezing point.

In the initial work on chlorinated m-phenylene diisocyanate described in the co-pending application cited above, it was believed that the solid material formed upon cooling compositions containing dichloro-m-phenylene diisocyanate was the higher chlorinated material, such as trichloro- or tetrachloro-m-phenylene diisocyanate, and that separation of the solids from the liquid would reduce the chlorine content of the remaining liquid. Quite surprisingly, however, I have discovered that the liquid remaining after partial crystallization of compositions containing dichloro-m-phenylene diisocyanate has substantially the same chlorine content as the original composition.

The unexpected results of the process of this invention are now known to be due to the formation of two isomers of dichloro-m-phenylene diisocyanate; namely, 2,4-dichloro-m-phenylene diisocyanate and 4,6-dichloro-m-phenylene diisocyanate. In the initial work, it was assumed that dichloro-m-phenylene diisocyanate was a single isomer. This was a logical conclusion since monochloro-m-phenylene diisocyanate and trichloro-m-phenylene diisocyanate are formed as a single isomer during the chlorination of m-phenylene diisocyanate. This assumption was further strengthened by the fact that gas phase chromatography revealed only one peak between the monochloro- and trichloro-m-phenylene diisocyanate peaks.

After my discovery that the freezing range of compositions containing dichloro-m-phenylene diisocyanate could be lowered by the method of this invention without reducing the chlorine content thereof, further investigation showed that dichloro-m-phenylene diisocyanate prepared by the chlorination of m-phenylene diisocyanate is composed of two isomers. When a gas phase chromatographic column with superior resolving power was used in the analysis, the dichloro- peak was resolved into two peaks, one of which corresponded to 2,4-dichloro-m-phenylene diisocyanate and the other to 4,6-dichloro-m-phenylene diisocyanate. Both of these isomers were prepared by an independent unambiguous synthesis for comparative purposes.

Chlorinated m-phenylene diisocyanate is readily prepared by the reaction of m-phenylene diisocyanate and chlorine at elevated temperatures with or without a catalyst. The chlorination reaction proceeds stepwise and thus can be terminated to form a product containing predominantly monochloro-, dichloro-, trichloro- or tetrachloro-m-phenylene diisocyanate or any adjacent mixture thereof. Suitable processes for chlorinating m-phenylene diisocyanate are fully disclosed by J. J. Tazuma in U.S. Patent Nos. 2,915,545 and 2,945,875. When chlorinating to the dichloro-stage, it is possible to stop the reaction at the point at which about 80% of the product is dichloro-m-phenylene diisocyanate with the remaining material being monochloro-m-phenylene diisocyanate or trichloro-m-phenylene diisocyanate or mixtures thereof. The dichloro-m-phenylene diisocyanate portion of the product will generally contain about 20–30% 2,4-dichloro-m-phenylene diisocyanate and about 70–80% 4,6-dichloro-m-phenylene diisocyanate. This is a 2,4-dichloro- to 4,6-dichloroisomeric ratio of about 0.25:1 to 0.43:1.

Chlorinated m-phenylene diisocyanates can also be prepared by chlorinating m-dinitrobenzene, reducing the nitro-groups to amine groups, and phosgenating to the chlorinated diisocyanate. Another alternative would be to chlorinate diaminobenzene and phosgenate to the chlorinated diisocyanate. However, the preferred method for producing chlorinated m-phenylene dissocyanate is by the direct chlorination of m-phenylene diisocyanate as discussed above.

The method disclosed herein for reducing the freezing range of compositions containing dichloro-m-phenylene diisocyanate in which the ratio of 2,4-dichloro-m-phenylene diisocyanate to 4,6-dichloro-m-phenylene diisocyanate is less than 5:1 without significantly reducing their chlorine content comprises partially crystallizing the composition by cooling, and separating the liquid phase from the solid phase. The solid formed by partial crystallization of the product is generally in the form of small interwoven crystals which tend to entrap some of the liquid. Accordingly, in many cases it is rather difficult to completely separate the liquid from the solid by filtration. This separation is improved by washing the crystals with an inert diluent. Suitable diluents include volatile hydrocarbons such as pentane, hexane, heptane, kerosene, hydrocarbon fractions, and the like. I have also found that the ease of separating the liquid from the solid is improved if the partial crystallization is carried out in the presence of a volatile hydrocarbon diluent. The diluent lowers the viscosity of the product and allows separate crystals to form which do not entrap liquid within their structure. After separation of the liquid phase from the solid phase, the diluent can be removed from the liquid phase by vaporization.

The process of this invention lowers the freezing range of compositions containing dichloro-m-phenylene diisocyanate by increasing the isomer ratio of 2,4-dichloro-m-phenylene diisocyanate to 4,6-dichloro-m-phenylene diisocyanate. The maximum ratio of these isomers which can be produced by chlorination of m-phenylene diisocyanate is about 0.45:1. When this ratio is increased in accordance with this invention to about 0.5:1, a significant lowering of the freezing range of the composition is accomplished. Optimum freezing characteristics result from compositions having a 2,4-dichloro- to 4,6-dichloro- isomer ratio in the range of about 0.65:1 to 3:1. There is no particular advantage in increasing the isomer ratio above about 5:1, since excessively low temperatures would be required, and no significant lowering of the freezing range results.

The composition containing dichloro-m-phenylene diisocyanate which is treated as taught herein may be a crude reaction product containing varying amounts of unchlorinated, monochloro-, trichloro-, or tetrachloro-m-phenylene diisocyanate in addition to the dichloro-m-phenylene component. The dichloro-m-phenylene diisocyanate may also be part of a blend of two or more reaction products, or it may be a reaction product which has undergone some refinement such as fractionation. The composition may also be a blend containing other aromatic polyisocyanates in addition to m-phenylene diisocyanates. In essence, any composition containing dichloro-m-phenylene diisocyanate, or composed entirely of dichloro-m-phenylene diisocyanate, may be treated in accordance with this invention to alter the isomer ratio of 2,4-dichloro-m-phenylene diisocyanate to 4,6-dichloro-m-phenylene diisocyanate, thereby lowering the freezing range.

The temperature to which the composition containing dichloro-m-phenylene diisocyanate is cooled will vary depending upon the desired ratio of solid to liquid or the desired freezing range of the liquid phase. The ratio of solid to liquid at any particular temperature will vary depending upon the particular composition. For example, blended compositions containing monochloro-, dichloro-, trichloro-, and tetrachloro-m-phenylene diisocyanate will contain less solid at a given temperature than a composition containing essentially only dichloro-m-phenylene diisocyanate. The temperature to which the composition is cooled will determine the upper limit of the freezing range of the liquid phase. The freezing ranges reported herein were determined by cooling the molten product while agitating, and reporting the range between the temperature at which crystals first appear and the set point. The set point is the temperature at which sufficient solids are present that voids can be created by stirring the liquid-crystal slurry.

When making chlorinated aromatic polyisocyanate blends for use in the preparation of flame-retardant polyurethane compositions, it is desirable to use a blend which has as high a chlorine content as possible and is completely liquid at about room temperature. Improved blends which may be prepared in accordance with this invention contain, by weight, about 25–40% tetrachloro-m-phenylene diisocyanate, about 25–40% trichloro-m-phenylene diisocyanate, about 15—40% dichloro-m-phenylene diisocyanate and about 0–30% m-phenylene diisocyanate selected from the group consisting of unchlorinated and monochloro-m-phenylene diisocyanate, and have an isomer ratio of 2,4-dichloro- to 4,6-dichloro-m-phenylene diisocyanate in the range of about 0.5:1 to 5:1. These blends have chlorine contents of about 29–42%, contain components all derived from the same diisocyanate, and are liquid at about room temperature or lower.

Particularly preferred blends are those containing, by weight, about 30–40% tetrachloro-, about 30–40% trichloro- and about 25–40% dichloro-m-phenylene diisocyanate in which the isomer ratio of 2,4-dichloro- to 4,6-dichloro- is in the range of about 0.65:1 to 3:1. These blends contain 38–42% chlorine and are liquid at about room temperature.

Another group of blends which are particularly preferred are those containing by weight, about 25–35% tetrachloro-, about 25–35% trichloro-, about 15–30% dichloro-, about 0–5% monochloro-, and about 10–25% unchlorinated m-phenylene diisocyanate, in which the isomer ratio of 2,4-dichloro- to 4,6-dichloro- is in the range of about 0.65:1 to 3:1. These blends contain 29–37% chlorine and are completely liquid at temperatures below about room temperature. The amount of monochloro-m-phenylene diisocyanate is purposely kept low since it is the most uneconomical of the chlorinated m-phenylene diisocyanates.

When preparing low freezing chlorinated m-phenylene diisocyanate blends which are suitable for preparing flame-retardant polyurethane compositions, it is necessary to prepare at least two chlorination products. These blends can be prepared, for example, by blending a product containing monochloro- and dichloro-m-phenylene diisocyanate with a product containing tricholo- and tetrachloro-m-phenylene diisocyanate. When preparing a blend containing no monochloro-m-phenylene diisocyanate, the first chlorination can be continued until the product contains dichloro- and trichloro-m-phenylene diisocyanate. More than two chlorination products may be used to prepare the blend, if desired, although it is not necessary.

It is advantageous to partially crystallize the component containing dichloro-m-phenylene diisocyanate before it is blended with the other component, rather than partially crystallizing the final blend. More solid material can be removed at a given temperature by partial crystallization of the dichloro-m-phenylene diisocyanate component rather than the final blend, since the freezing range of the resulting liquid phase will be further lowered by blending it with the other component. The solid phase obtained by partial crystallization of the dichloro- component can be further chlorinated to produce the higher chlorinated component, thus utilizing all of the products formed during the chlorination. If it is desired to lower the freezing range of the final blend in accordance with this invention, the solids recovered can be recycled to the final chlorination step. Unchlorinated m-phenylene diisocyanate can be added to the blend, if desired, at any stage.

The preferred method for preparing low freezing, highly chlorinated m-phenylene diisocyanate blends utilizing the process of this invention comprises chlorinating m-phenylene diisocyanate to predominantly the dichloro-stage, partially crystallizing the dichloro-m-phenylene diisocyanate by cooling, separating the liquid phase from the solid phase, further chlorinating the solid phase to form predominantly a mixture of trichloro-m-phenylene diisocyanate and tetrachloro-m-phenylene diisocyanate, and combining the dichloro-m-phenylene diisocyanate liquid phase with the mixture of trichloro-m-phenylene diisocyanate and tetrachloro-m-phenylene diisocyanate, thereby forming the desired low freezing blend. For example, when preparing a blend containing an equal amount of each of these three components, the dichloro-reaction product should be partially crystallized until about 62% solids are formed. When these solids are further chlorinated, the additional weight gained during chlorination will increase their contribution to about 67% by weight of the total blend.

The following examples, illustrating the novel method disclosed herein for lowering the freezing range of compositions containing dichloro-m-phenylene diisocyanate, are presented without any intention that the invention be limited thereto. All percentages are by weight.

Example 1

Two chlorination products containing dichloro-m-phenylene diisocyanate were prepared as follows:

(a) About 1200 g. of m-phenylene diisocyanate was charged to a flask equipped with a thermometer, a mechanical stirrer and an exit gas tube. To the flask was added 10 g. of iron powder as catalyst, and chlorine was bubbled through the liquid at an initial rate of 4 moles per hr. at a temperature of 175° C. The rate of chlorine addition was decreased as the chlorine content of the exit gases increased. After 9 hrs., 1745 g. of crude product was obtained. This product was fractionated to give 1243 g. of product distilling at 106–108° C. at 0.35–0.30 mm. Hg and containing 0.4% monochloro-, 20.8% 2,4-dichloro-, 59.9% 4,6-dichloro-, 17.2% trichloro-, and 1.7% tetrachloro-m-phenylene diisocyanate for a 2,4-dichloro- to 4,6-dichloro-isomer ratio of 0.35:1. This product had a chlorine content of 33%.

(b) The above preparation was repeated except that the chlorination reaction was allowed to continue for only 8 hrs. The distilled product contained 17.7% monochloro-, 23.9% 2,4-dichloro-, 54.4% 4,6-dichloro-, and 4.0% trichloro-m-phenylene diisocyanate for a 2,4-dichloro- to 4,6-dichloro-isomer ratio of 0.44:1. This product had a chlorine content of 29%.

A composition containing dichloro-m-phenylene diisocyanate was partially crystallized in the presence of heptane as follows: A composition containing dichloro-m-phenylene diisocyanate was prepared by completely melting the chlorination products prepared above and blending 946 g. of product (a) with 272 g. of product (b). To this mixture was added 400 g. of heptane and the mixture was allowed to cool to room temperature (24° C.). The crystals which formed were separated by filtration and washed with hexane. The filtrate and wash liquid was heated to 95° C. at 20 mm. Hg to remove all diluent. The remaining 645 g. of liquid product contained 8.5% monochloro-, 27.8% 2,4-dichloro-, 20.6% 4,6-dichloro-, and 43.1% trichloro-m-phenylene diisocyanate for a 2,4-dichloro-, to 4,6-dichloro-isomer ratio of 1.34:1, and had a chlorine content of 34%.

Example 2

This example illustrates partial crystallization at 5° C. A 200 g. portion of chlorination product (b), prepared in Example 1, was allowed to cool in a refrigerator to 5° C. The liquid phase was separated from the solids to give 33 g. of liquid containing 32% monochloro-, 44% 2,4-dichloro-, 14.2% 4,6-dichloro-, and 9.8% trichloro-m-phenylene diisocyanate for a 2,4-dichloro- to 4,6-dichloro-isomer ratio of 3.1:1. The liquid had a chlorine content of 28%. The solids had a melting range of 80–83° C.

Example 3

This example illustrates partial crystallization at room temperature. In a manner similar to Example 1, 950 g. of distilled product containing 0.1% m-phenylene diisocyanate, 0.7% molochloro-, 16.3% 2,4-dichloro-, 78.1% 4,6-dichloro-, and 4.8% trichloro-m-phenylene diisocyanate, and having a melting range of 61–73° C. and a chlorine content of 31%, was prepared. This product was allowed to cool overnight to room temperature (24° C.) after which 851 g. of solids were filtered from 99 g. of liquid. The dichloro-m-phenylene diisocyanate component of this liquid was concentrated by fractionating 68 g. of the liquid to give 40 g. of a fraction boiling between 125° and 128° C. at 5 mm. Hg and containing 1.4% m-phenylene diisocyanate, 1.7% monochloro-, 61.7% 2,4-dichloro-, 31.1% 4,6-dichloro-, and 4.1% trichloro-m-phenylene diisocyanate for a 2,4-dichloro- to 4,6-dichloro-isomer ratio of 2:1. This fraction had a freezing range of 35–38° C. and a chlorine content of 31%.

Example 4

A blend of chlorinated m-phenylene diisocyanates containing 0.7% monochloro-, 7.1% 2,4-dichloro-, 25.7% 4,6-dichloro-, 36% trichloro-, and 30.5% tetrachloro-m-phenylene diisocyanate, and having a freezing range of 24–31° C. and a chlorine content of 39% was completely melted and allowed to cool to 24.5° C. The liquid phase was separated from the solids and found to contain 11.7% 2,4-dichloro-, 20.5% 4,6-dichloro-, 44.5% trichloro-, and 23.3% tetrachloro-m-phenylene diisocyanate for a 2,4-dichloro- to 4,6-dichloro-isomer ratio of 0.57:1. This liquid blend had a freezing range of 23–24.5° C. and a chlorine content of 39%.

Examples 5–8

In order to determine the effect of changing the isomer ratio of 2,4-dichloro-m-phenylene diisocyanate to 4,6-dichloro-m-phenylene diisocyanate upon the freezing range of blends containing them, the following blends were prepared. The freezing range of each of the blends was measured and is reported in the following table.

| Example | 5 | 6 | 7 | 8 |
|---|---|---|---|---|
| 2,4-dichloro-m-PDI [1], percent | 8.3 | 0 | 16.65 | 33.3 |
| 4,6-dichloro-m-PDI, percent | 25 | 33.3 | 16.65 | 0 |
| Trichloro-m-PDI, percent | 33.3 | 33.3 | 33.3 | 33.3 |
| Tetrachloro-m-PDI, percent | 33.3 | 33.3 | 33.3 | 33.3 |
| Ratio of: 2,4-dichloro-m-PDI to 4,6-dichloro-m-PDI | 0.33 | 0 | 1 | |
| Freezing Range, ° C | 25–32 | 35–41 | 21–26 | 25–32 |

[1] Phenylene diisocyanate.

The composition of Example 5 is a typical chlorinated m-phenylene diisocyanate blend of the prior art in which the 2,4-dichloro- and 4,6-dichloro-isomers are in the ratio which is formed by chlorinating m-phenylene diisocyanate. Example 6 shows that increasing the 4,6-dichloro-isomer raises the freezing range. Example 7 shows that using equal amounts of the 2,4-dichloro- and 4,6-dichloro-isomers lowers the freezing range. Example 8 shows that increasing the 2,4-dichloro-isomer to a maximum gives a freezing range higher than that of the composition containing equal amounts of the two isomers, but equivalent to that of the prior art composition.

Example 9

A low-freezing, highly chlorinated m-phenylene diisocyanate blend was prepared as follows: A chlorination product containing 6% monochloro-, 81% dichloro- and 13% trichloro-m-phenylene diisocyanate was partially crystallized until 58% of the material had been separated as solid. This solid material was further chlorinated to a product containing 44% trichloro- and 56% tetrachloro-m-phenylene diisocyanate. This product was blended with the liquid material obtained by partial crystallization of the first chlorination product to give a composition containing 5% monochloro-, 27% dichloro-, 34% trichloro- and 34% tetrachloro-m-phenylene diisocyanate and having a freezing range of 14–23° C. and a chlorine content of 39%.

*Example 10*

Another low-freezing, highly chlorinated m-phenylene diisocyanate blend was prepared as follows: A chlorination product containing 78% dichloro-, 19% trichloro- and 3% tetrachloro-m-phenylene diisocyanate was partially crystallized until 63% of the material was separated as solid. This solid material was further chlorinated to a product containing 49% trichloro- and 51% tetrachloro-m-phenylene diisocyanate. This product was blended with the liquid material obtained by partial crystallization of the first chlorination product to give a composition containing 30% dichloro-, 40% trichloro- and 30% tetrachloro-m-phenylene diisocyanate and having a freezing range of 17–24° C. and a chlorine content of 40%.

As will be apparent to those skilled in the art, numerous modifications and variations of the embodiments illustrated above may be made without departing from the spirit of the invention or the scope of the following claims.

I claim:

1. Dichloro-m-phenylene diisocyanate having an isomer ratio of 2,4-dichloro-m-phenylene diisocyanate to 4,6-dichloro-m-phenylene diisocyanate in the range of 0.5:1 to 5:1.

2. Dichloro-m-phenylene diisocyanate having an isomer ratio of 2,4-dichloro-m-phenylene diisocyanate to 4,6-dichloro-m-phenylene diisocyanate in the range of 0.65:1 to 3:1.

3. A chlorinated m-phenylene diisocyanate blend which comprises, by weight, 25–40% tetrachloro-m-phenylene diisocyanate, 25–40% trichloro-m-phenylene diisocyanate, 15–40% dichloro-m-phenylene diisocyanate and 0–30% m-phenylene diisocyanate selected from the group consisting of unchlorinated and monochloro-m-phenylene diisocyanate, said blend having an isomer ratio of 2,4-dichloro-m-phenylene diisocyanate to 4,6-dichloro-m-phenylene diisocyanate in the range of 0.5:1 to 5:1.

4. A chlorinated m-phenylene diisocyanate blend which comprises, by weight, 30–40% tetrachloro-m-phenylene diisocyanate, 30–40% trichloro-m-phenylene diisocyanate, and 25–40% dichloro-m-phenylene diisocyanate, said blend having an isomer ratio of 2,4-dichloro-m-phenylene diisocyanate to 4,6-dichloro-m-phenylene diisocyanate in the range of 0.65:1 to 3:1.

5. A chlorinated m-phenylene diisocyanate blend which comprises, by weight, 25–35% tetrachloro-m-phenylene diisocyanate, 25–35% trichloro-m-phenylene diisocyanate, 15–30% dichloro-m-phenylene diisocyanate, 0–5% monochloro-m-phenylene diisocyanate and 10–25% unchlorinated m-phenylene diisocyanate, said blend having an isomer ratio of 2,4-dichloro-m-phenylene diisocyanate to 4,6-dichloro-m-phenylene diisocyanate in the range of 0.65:1 to 3:1.

6. A method of lowering the freezing range of a dichloro-m-phenylene diisocyanate composition in which the isomer ratio of 2,4-dichloro-m-phenylene diisocyanate to 4,6-dichloro-m-phenylene diisocyanate is less than 3:1 without significantly reducing its chlorine content which comprises partially crystallizing the composition by cooling until a crystalline solid phase is formed in equilibrium with the liquid phase thereby increasing the isomer ratio of 2,4-dichloro-m-phenylene diisocyanate to 4,6-dichloro-m-phenylene diisocyanate, separating the liquid phase and the solid phase and recovering the liquid phase having a freezing range lower than that of the original composition and a chlorine content substantially the same as that of the original composition.

7. A method of preparing low freezing chlorinated m-phenylene diisocyanate blends which comprises chlorinating m-phenylene diisocyanate by reaction with chlorine at elevated temperature to form a product containing predominantly dichloro-m-phenylene diisocyanate in which the isomer ratio of 2,4-dichloro-m-phenylene diisocyanate to 4,6-dichloro-m-phenylene diisocyanate is not in excess of 0.45:1, partially crystallizing the dichloro-m-phenylene diisocyanate product by cooling until a crystalline solid phase is formed in equilibrium with the liquid phase thereby increasing the 2,4-dichloro-m-phenylene diisocyanate to 4,6 - dichloro-m-phenylene diisocyanate isomer ratio to within the range of 0.65:1 to 3:1, separating the liquid phase and the solid phase, further chlorinating the solid phase by reaction with chlorine at elevated temperature to form predominantly a mixture of trichloro-m-phenylene diisocyanate and tetrachloro-m-phenylene diisocyanate, and combining the dichloro-m-phenylene diisocyanate liquid phase with the mixture of trichloro-m-phenylene diisocyanate and tetrachloro-m-phenylene diisocyanate, thereby forming a low freezing blend containing dichloro-m-phenylene diisocyanate, trichloro-m-phenylene diisocyanate and tetrachloro-m-phenylene diisocyanate.

No references cited.

CHARLES B. PARKER, *Primary Examiner.*

IRVING MARCUS, *Examiner.*